Sept. 24, 1963      P. KESLING      3,104,721
HELICOPTER ENGINE FAILURE WARNING SYSTEM
Filed Sept. 19, 1962      2 Sheets-Sheet 1

INVENTOR.
PAUL KESLING
BY
Bean, Brooks, Buckley + Bean
ATTORNEYS

Sept. 24, 1963 P. KESLING 3,104,721
HELICOPTER ENGINE FAILURE WARNING SYSTEM
Filed Sept. 19, 1962 2 Sheets-Sheet 2

INVENTOR.
PAUL KESLING
BY
Beau, Brooks, Buckley & Beau.
ATTORNEYS 3,104,721
HELICOPTER ENGINE FAILURE WARNING
SYSTEM
Paul Kesling, Arlington, Tex., assignor to Bell Aerospace
Corporation, Wheatfield, N.Y.
Filed Sept. 19, 1962, Ser. No. 224,639
4 Claims. (Cl. 170—160.22)

This invention relates to warning system for helicopters and, in particular, pertains to such a system for use in conjunction with turbine engine powered helicopters.

During normal flight in a turbine engine powered helicopter, experience has indicated that the pilot will not monitor the engine instruments since the turbine is equipped with a governor which relieves him of engine speed control responsibility. However, it is a characteristic of turbine engine powered helicopters that there is no pilot-discernible exhaust noise or engine vibration which, by virtue of its change of character, would apprise the pilot of power failure. Naturally, the pilot would immediately sense a complete power failure because of the resultant behavior of the craft, but partial power failures are not readily detected by such means. Thus, there exists a need for a partial power failure warning system under ordinary flight conditions. Additionally, there is a need for a warning system in case of complete power failure during simulated autorotation, simulated autorotation being a standard maneuver which must be mastered by the trainee pilot. The system of the present invention contemplates the provision of a system capable of providing warning in case of partial power failure during normal flight and which also encompasses means for defeating the aforesaid warning during simulate autorotation (which aforesaid warning would be manually induced by deliberate power reduction at the onset of simulated autorotation) while still maintaining the capability of providing a warning should complete power failure occur during the simulated autorotation.

More specifically, it is an object of this invention to provide a warning system during normal flight indicative of loss of power to some predetermined extent, as, for example, to the point that insufficient torque is available to drive the rotor in flat pitch; the system also including means responsive to the collective pitch of the rotor blade being placed in autorotation position which defeats the partial power failure mechanism; the system further incorporating an override for the defeating means which will give warning in case of complete power failure during simulated autorotation.

Thus, the warning system according to the present invention relates to a compound system capable of indicating both a dangerous loss of power during normal flight and a dangerous loss of power during simulated autorotation.

Other objects and advantages of the invention will appear from the description hereinbelow and the accompanying drawing wherein.

Figure 1:
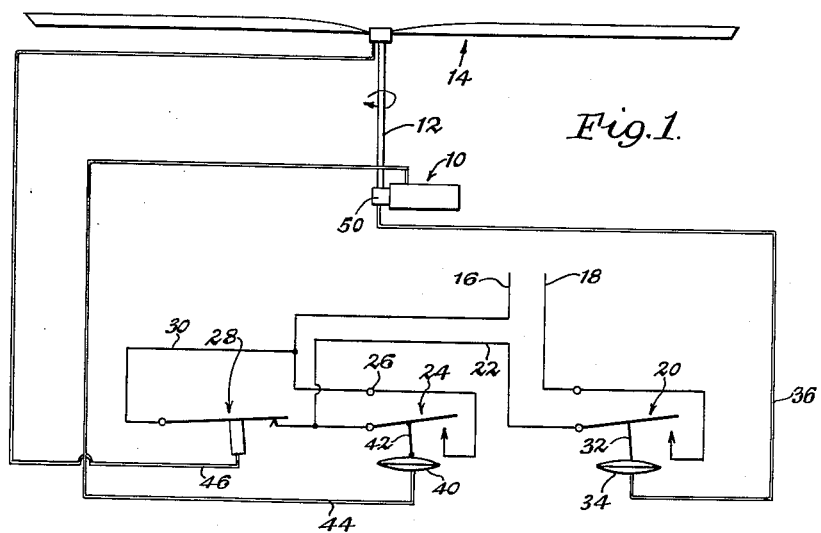
FIG. 1 is a diagrammatic view illustrating the principles of the present invention and showing the condition of the warning system during normal flight when the power system is completely operative.

Referring now more particularly to FIG. 1, reference character 10 designates in general a diagrammatic showing of a turbine engine associated with a helicopter, the exact construction of the aircraft not being shown. The turbine is coupled to a conventional mast 12 upon which is drivingly mounted the rotor assembly indicated by reference character 14. It is to be understood that the exact construction of the assemblages 10, 12 and 14 may be in accord with any desired or conventional construction and arrangement, the precise nature thereof forming no part of the present invention.

The warning system according to the present invention includes a pair of conductors 16 and 18 which, when the circuit therethrough is completed by the switch means as hereinafter described, will produce a suitable warning such as a light, a buzzer, a horn or the like. For example, when the circuit through the conductors 16 and 18 is completed, a buzzer may be made to sound in the pilot's earphones and, in any event, it will be understood that the conductors 16 and 18 may extend to any suitable circuitry which, when completed, will produce the requisite warning signal.

It will be seen that there are two paths for completion of the circuit between the conductors 16 and 18. One of these paths includes the switch mechanism indicated generally by the reference character 20, the conductor 22 and the switch mechanism 24, which will complete the circuit to the juncture 26 which connects to the conductor 16. The other path includes the previously mentioned switch 20, the conductor 22, the switch mechanism 28 which connects, through the conductor 30, back to the conductor 16. Thus, the two switches 24 and 28 are disposed in parallel relationship so that when either one or both of them are closed, and the switch 20 is also closed, the circuit will be completed as between the conductors 16 and 18 and a warning signal will therefore be sounded.

The switch 20 is preferably of pressure sensitive form and may include a bellows or flexible diaphragm connected to the switch element by link 32, the actuating means in any case being indicated by reference character 34. Pressure connection to the engine or drive assembly torque pressure source is obtained through conduit 36. Normally, the switch 20 is closed and is urged to the open position shown in FIG. 1 during normal flight conditions so long as sufficient torque is available to drive the rotor 14 in flat pitch. Once the torque falls below this value, the switch 20 will close. To achieve this effect, it is preferred that the conduit 36 be connected to the torque pressure connection of the engine 10 or the drive assembly 50 which serves as a drive interconnection and speed reducing means between the turbine 10 and the mast or rotor shaft 12.

The switch 24 is also pressure responsive and its actuator is preferably similar to the actuator for the switch 20, being designated by reference character 40 and the actuating link by reference character 42. Pressure connection is obtained through conduit 44 to the compressor region of the turbine 10. As a pressure measurement derived from the compressor region of the turbine 10 is proportionate to the engine speed, switch 24 is actually responsive to and a measurement of engine speed. The switch 24 is normally urged to closed position but, during normal flight conditions, or any time the turbine is running at idle speed or above, the switch is disposed in open position as is shown in FIG. 1.

The switch 28 is responsive to the pitch adjustment of the rotor assembly 14 and, specifically, the switch 28 is disposed in normally closed position except in that instance wherein the rotor blades are adjusted within the autorotation collective pitch range thereof. When the rotor blades are placed in such collective pitch range, the switch 28 will be open.

To appreciate the operation of the system, reference is first had to FIG. 1 wherein all of the switch means 20, 24 and 28 are disposed in the positions thereof such as prevail during normal flight conditions. The craft, in the position of the switch means shown in FIG. 1, is operating with the turbine running at normal operating speed and producing torque within a range above the predetermined minimum amount. The switch 20 is therefore urged to open position and since the compressor pressure in the turbine 10 will be sufficiently high at normal operating speed, the switch 24 is also disposed in open position.

The switch 28, on the other hand, will be disposed in closed position as shown in FIG. 1 to prepare the system for warning by completion of the circuit through the medium of switch 20. It will be understood that the switch 28 is connected by any suitable means 46 so as to be responsible to the pilot-controlled collective pitch lever position, the switch 28 remaining closed until such time as the collective pitch control lever is disposed within the autorotation pitch range. As specifically shown in FIG. 1, the connecting means 46 extends to the rotor assembly 14 to graphically illustrate that this switch 28 is responsive to positioning of the rotor assembly, but it is to be understood that the actuating means for switch 28 may be as well connected directly to the collective pitch lever mechanism.

Figure 2:
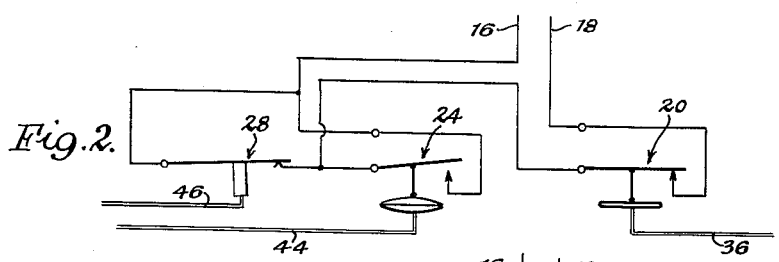
FIG. 2 is a view similar to FIG. 1 but illustrating the condition of the warning system should partial power failure occur during normal flight.
Figure 3:
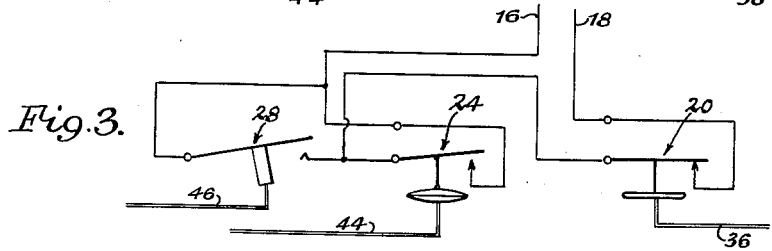
FIG. 3 is a view similar to FIG. 2 but showing the manner in which the collective pitch mechanism defeats the partial power warning indicator when the helicopter is controlled for simulated autorotation.
Figure 4:
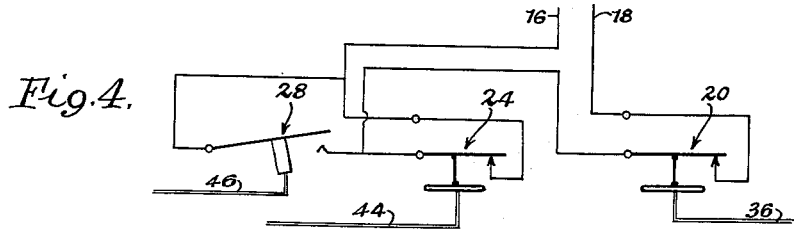
FIG. 4 is a view similar to FIGS. 2 and 3 but showing the condition of the components should complete power failure occur during simulated autorotation.

Should, during normal flight, the turbine 10 experience a partial power failure so that the torque thereof at normal operating speed is less than that required to drive the rotor in flat pitch, the switch 20 will be closed as is shown in FIG. 2. Since the switch 28 remains closed during normal flight, a signal will be sounded since the circuit between the conductors 16 and 18 is completed. If, however, the pilot desires to embark upon simulated autorotation, he will deliberately manipulate the engine power level to idle and thus cause switch 20 to close. The warning system will now operate, but since it is not desirable because the pilot has deliberately reduced power and because the pilot now needs to know only that the turbine is running at idle speed, the warning system is defeated by moving the collective pitch lever to the autorotation pitch range to thus open the switch 28, such relationship being illustrated in FIG. 3 of the drawing. At this time, if the turbine 10 is operating properly, the same will be running at idling speed so that the switch 24 remains open and the circuit between conductors 16 and 18 will remain in open condition. If, however, complete failure of the turbine 10 occurs during normal simulated autorotation when the system is in the condition shown in FIG. 3, the switch 24 will close which, operating in conjunction with the already closed switch 20, will complete the circuit between the conductors 16 and 18 and provide a warning of the power failure, as shown in FIG. 4. Thus, even though the collective pitch lever when moved to the autorotation pitch range defeats the normal flight warning system, the switch 24 provides an override means for the switch 28 to assure that the system retains the capability for warning in response to power failure during simulated autorotation. Thus, the system is useful not only during normal flight wherein the switch 20 will perform the warning function, but the system is also capable of indicating power failure during simulated autorotation, the complete system requiring only three switch mechanisms each of which is of high reliability to minimize the possibility of system failure.

Figure 5:
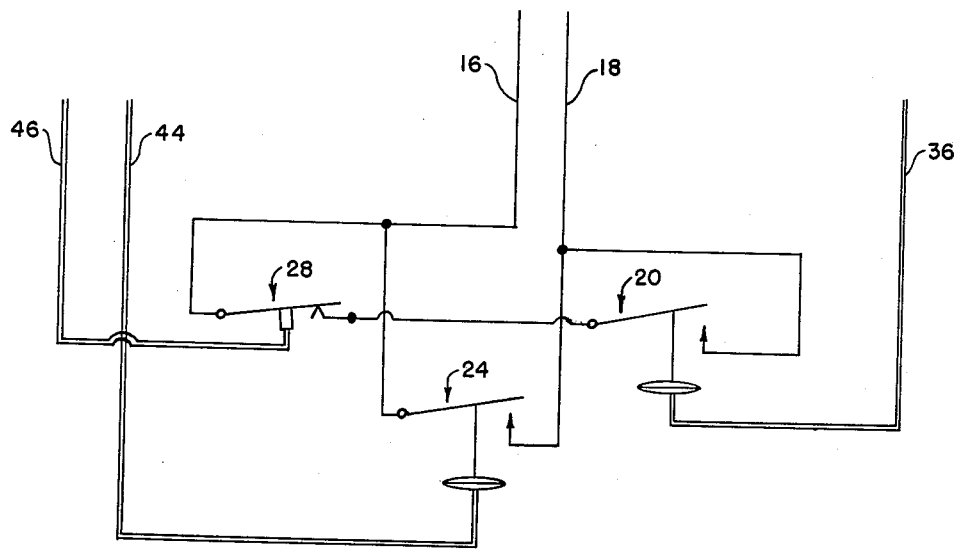
FIG. 5 is a view similar to FIG. 2 but showing an alternate wiring system.

In the alternative switch combination shown in FIG. 5, it will be noted that the torque-responsive and rotor pitch-responsive switches 20 and 28 are disposed electrically in series while the engine speed-responsive switch 24 is disposed electrically in parallel with the series switches 20 and 28. The system of FIG. 5 operates in the same fashion as does the system according to FIGS. 1–4, as comparison of FIG. 5 with the switch position of FIGS. 1–4 will readily show. That is, in FIG. 5, when the several switches are in normal operating condition corresponding to the switch position of FIG. 1, the warning device will be inoperative since both switches 20 and 24 will be open. When switch 20 closes due to partial power failure (FIG. 2), connection between conductors 16 and 18, in FIG. 5, will be completed through switches 20 and 28. To defeat the condition in FIG. 5 when engine power is reduced during simulated autorotation, switch 28 opens (as in FIG. 3) to disrupt the connection between conductors 16 and 18 and, of course, whenever complete power failure occurs and switch 24 is closed, the warning signal will be actuated.

It will, of course, be appreciated that, whereas only one specific form of the invention has been illustrated and described in detail hereinabove, various changes may be made without departing from the spirit of the invention or the scope of the following claims.

What is claimed is:

1. In combination with a helicopter of the type having a rotor, tubine engine assembly for driving said rotor and means for effecting collective pitch change of the rotor blades,
    a power failure warning system including a first switch connected to said means and urged thereby into closed position under all conditions except that in which the rotor blades are within the autorotation pitch range,
    a pressure responsive second switch connected to the compressor stage of said turbine and urged thereby to open position at all engine speeds including idling speed and above,
    a torque responsive third switch connected to said turbine engine assembly for driving said rotor and urged thereby into open position under all conditions in which the engine is running at operating speed and delivering at least enough torque to drive the rotor in flat pitch,
    said first and third switches being disposed, electrically, in series to actuate the warning system when closed simultaneously and said second switch, when closed actuating said warning system.

2. In combination with a helicopter of the type having a turbine engine power system and a pitch-variable bladed rotor driven by the power system,
    a warning system for indicating partial loss of power during normal flight and for indicating substantially complete loss of power during simulated autorotation,
    said warning system comprising first switch means adapted for actuation upon partial loss of engine power during normal flight and second switch means responsive to disposition of said bladed rotor in autorotation pitch range to defeat said first switch means,
    and third switch means adapted for actuation upon the engine operating below idling speed to override said second switch means.

3. In the combination as defined in claim 2 wherein said first switch means is actuated in response to power system torque falling below that value required to drive the rotor in flat pitch with the engine running at operating speed.

4. In the combination as defined in claim 3 wherein said second and third switch means are disposed in parallel, the second switch means being closed during normal operation and the third switch means being open during normal operation,
    said first switch means being open during normal operation and disposed in series with said second and third switch means.

No references cited.